Patented Sept. 16, 1924.

1,508,603

UNITED STATES PATENT OFFICE.

WILHELM KOLLE, HUGO BAUER, AND ERNST MASCHMANN, OF FRANKFORT-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

PROCESS OF PREPARING BISMUTH SALTS OF MERCURATED ORGANIC COMPOUNDS CONTAINING AN ACID RESIDUE AND THE PRODUCTS OBTAINABLE THEREFROM.

No Drawing. Application filed January 23, 1923. Serial No. 614,471.

*To all whom it may concern:*

Be it known that we, WILHELM KOLLE, HUGO BAUER, and ERNST MASCHMANN, citizens of Germany, residing at Frankfort-on-the-Main, Germany, have invented certain new and useful improvements in processes of preparing bismuth salts of mercurated organic compounds containing an acid residue and the products obtainable therefrom, of which the following is a specification.

We have found that therapeutically important compounds, containing both mercury and bismuth, can be obtained by combining mercuro-organic compounds containing an acid residue, in the form of their alkali salts, with bismuth salts. These new compounds are distinguished by their efficacious action in the treatment of syphilis and they are less toxic than would be expected from the amount of mercury which they contain.

The following examples will illustrate our invention:

1. 10 gr. of anhydride of o-hydroxy-mercuri-salicylic acid having the formula:

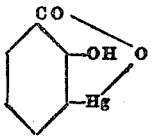

(see Dimroth, Berichte der Deutsch. Chem. Ges. 35, 2872 (1902) are dissolved in 100 ccm. of water while adding caustic soda solution and combined with a solution of 9.5 gr. of bismuth chloride in 10 ccm. of concentrated hydrochloric acid and 50 ccm. of water. A white voluminous precipitate is formed which, after being dried, contains 33.9 per cent of mercury and 36% of bismuth.

2. To 7.7 gr. of o-oxymercurybenzoic acid (see Berichte der Deutschen Chem. Ges. 35, 2870 —1902—), dissolved in 25 ccm. of double normal caustic soda solution while adding 700 ccm. of water, are added 6.3 gr. of bismuth chloride dissolved in 10 ccm. of concentrated hydrochloric acid and 20 ccm. of water. A white flocculent precipitate is formed which, after being dried, contains 38% of mercury and 33% of bismuth.

3. To 3.5 gr. of oxymercuryanthranilic acid anhydride (see Berichte der Deutsch. Chem. Ges. 47, 1937) dissolved in 12 ccm. of double normal caustic soda solution and 800 ccm. of water, are added 3.15 gr. of bismuth chloride, dissolved in 5 ccm. of concentrated hydrochloric acid and 20 ccm. of water. The salt which separates in the form of a white precipitate contains, after being dried, 28% of mercury and 38% of bismuth.

4. To 4 gr. of oxymercuryacetic acid anhydride

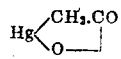

(see Berichte der Deutsch. Chem. Ges. 41, 2090), dissolved in 15 ccm. of water and the required quantity of double normal caustic soda solution (about 12 ccm.) are added 4 gr. of bismuth nitrate dissolved in a quantity as small as possible of diluted nitric acid. Thus the oxymercuryacetate of bismuth is obtained as a white precipitate.

5. To 3.5 gr. of oxymercuryphenoxyacetic acid

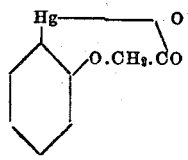

(see D. R. P. 261229, Friedländer XI, 1100), dissolved in 15 ccm. of water while adding 10 ccm. double normal caustic soda solution, is added a solution of 2.5 gr. of bismuth nitrate in a quantity as small as possible of diluted nitric acid. The oxymercury phenoxy acetate of bismuth separates in the form of a white precipitate.

6. To a solution of 8.8 gr. of oxymercury sulfosalicylate of sodium (see D. R. P. 216267, Friedländer IX 1070) in 200 ccm. of water are added 3.2 gr. of bismuth nitrate dissolved in a small quantity of nitric acid, whereupon the bismuth salt of the oxymercury sulfosalicylic acid separates as a white precipitate.

7. To 3.9 gr. of the sodium salt of the oxymercuryphenylglycine (see Schöller, Schrauth, Goldacker, Ber. d. Deutsch. Chem. Ges. 44, 1304 —1911—) dissolved in the required quantity of water are added 3.15 gr. of bismuth chloride, dissolved in 5 ccm. of concentrated hydrochloric acid and 20 ccm. of water. The salt separates as a white precipitate.

8. To 4.6 gr. of the sodium salt of the 2-oxymercurynaphthoic acid (see Brieger u. Schulemann, Journ. f. practical Chemistry 89, 151 —1914—) brought into solution with the required quantity of water, are added 3.15 gr. of bismuth chloride dissolved in 5 ccm. of concentrated hydrochloric acid and 20 ccm. of water.

9. To 4.1 gr. of the sodium of the oxymercury-oxy-hydrocinnamic acid (see Biilmann, Ber. d. Deutsch. Chem. Ges. 43, 575 —1910—) brought into solution with the required quantity of water are added 3.15 gr. of bismuth chloride, dissolved in 5 ccm. of concentrated hydrochloric acid and 20 ccm. of water.

10. To 4.8 gr. of the sodium salt of the oxymercury-2-phenylquinoline-4-carboxylic acid (D. R. P. 289246) brought into solution with the required quantity of water, are added 3.15 gr. of bismuth chloride dissolved in 5 ccm. of concentrated hydrochloric acid and 20 ccm. of water.

11. To 3.9 gr. of the sodium salt of the oxymercurycamphocarboxylic acid (D. R. P. 275932) dissolved in the required quantity of water, are added 3.15 gr. of bismuth chloride dissolved in 5 ccm. of concentrated hydrochloric acid and 20 ccm. of water.

Having now described our invention what we claim is:

1. The process of preparing bismuth salts of organic compounds of mercury each containing an acid residue, which consists in combining mercury-organic compounds containing an acid residue, in form of their alkali salts with bismuth salts.

2. As new products, the bismuth salts of organic compounds of mercury each containing an acid residue, which can be obtained by the action of mercury-organic compounds containing an acid residue in the form of their alkali salts upon bismuth salts, said new products being of therapeutical efficiency in the treatment of syphilis and less toxic than would be expected from the amount of mercury which they contain.

In testimony whereof, we affix our signatures.

WILHELM KOLLE.
HUGO BAUER.
ERNST MASCHMANN.

Witnesses:
BASIL E. SAVARD,
C. C. L. B. WYLES.